United States Patent
Tucker et al.

(10) Patent No.: US 9,652,681 B1
(45) Date of Patent: May 16, 2017

(54) USING GEOSPATIAL CONTEXT INFORMATION IN IMAGE PROCESSING

(71) Applicant: Lockheed Martin Corporation, Bethesda, MD (US)

(72) Inventors: Jonathan D. Tucker, Orlando, FL (US); Steven R. Stanfill, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 35 days.

(21) Appl. No.: 14/728,224

(22) Filed: Jun. 2, 2015

Related U.S. Application Data

(60) Provisional application No. 62/007,216, filed on Jun. 3, 2014.

(51) Int. Cl.
| | |
|---|---|
| *G06K 9/00* | (2006.01) |
| *G06K 9/32* | (2006.01) |
| *G06K 9/74* | (2006.01) |
| *G06K 9/46* | (2006.01) |
| *G06T 7/00* | (2017.01) |
| *G01S 13/00* | (2006.01) |

(52) U.S. Cl.
CPC ......... *G06K 9/3241* (2013.01); *G06K 9/0063* (2013.01); *G06K 9/00637* (2013.01); *G06K 9/3275* (2013.01); *G06K 9/4604* (2013.01); *G06K 9/74* (2013.01); *G06T 7/004* (2013.01); *G06K 2209/21* (2013.01); *G06T 2207/10032* (2013.01); *G06T 2207/30184* (2013.01)

(58) Field of Classification Search
USPC ....... 382/100, 103, 106–107, 151, 162, 173, 382/181, 190–199, 219, 224, 232, 254, 382/274, 276, 286–291, 305, 312, 113, 382/165; 342/52, 63; 703/9
See application file for complete search history.

(56) References Cited

U.S. PATENT DOCUMENTS

| | | | |
|---|---|---|---|
| 7,676,065 B2 | 3/2010 | Wiedemann et al. | |
| 8,026,842 B2 * | 9/2011 | Fox | G01S 7/2922 342/52 |
| 2006/0239537 A1 | 10/2006 | Shragai et al. | |
| 2010/0310121 A1 * | 12/2010 | Stanfill | G06K 9/3241 382/103 |

(Continued)

OTHER PUBLICATIONS

Brown, Alison, et al., "Near Real-Time Dissemination of Geo-Referenced Imagery by an Enterprise Server," NAVSYS Corporation, Jun. 2006, Proceedings of 2006 Geo Tec, Ottawa, Ontario, Canada, 14 pages.

(Continued)

*Primary Examiner* — Seyed Azarian
(74) *Attorney, Agent, or Firm* — Withrow & Terranova, PLLC

(57) ABSTRACT

Using geospatial context information in image processing is disclosed. Contextual information that identifies features in an area of earth is accessed. An image of the area of the earth is accessed. A mask is generated based on the contextual information. The mask spatially corresponds to the image and identifies at least one image portion of interest in the image and at least one image portion of non-interest in the image. The at least one image portion of interest is processed to detect a target depicted in the at least one image portion of interest.

21 Claims, 13 Drawing Sheets

(56) References Cited

U.S. PATENT DOCUMENTS

| | | | |
|---|---|---|---|
| 2011/0280453 A1* | 11/2011 | Chen | G06T 7/0046 |
| | | | 382/113 |
| 2013/0004017 A1* | 1/2013 | Medasani | G01S 7/412 |
| | | | 382/103 |
| 2014/0029844 A1* | 1/2014 | Padwick | G06K 9/4652 |
| | | | 382/165 |
| 2014/0129198 A1* | 5/2014 | Eddy | G06F 17/5009 |
| | | | 703/9 |

OTHER PUBLICATIONS

Conte, Gianpaolo, et al., "High Accuracy Ground Target Geo-location Using Autonomous Micro Aerial Vehicle Platforms," AIAA Guidance, Navigation, and Control Conference Exhibit, American Institute of Aeronautics and Astronautics, Aug. 18-21, 2008, Honolulu, Hawaii, 14 pages.

Grabbe, Michael T., et al., "Geo-Location Using Direction Finding Angles," Johns Hopkins APL Technical Digest, vol. 31, No. 3, 2013, pp. 254-262.

Shahbazian, Elisa, et al., "Fusion of Imaging and Non-imaging Data for Surveillance Aircraft," Proceedings of the SPIE, vol. 3067, Conference: "Sensor Fusion: Architecture, Algorithms and Applications," 1997, Orlando, FL, 11 pages.

\* cited by examiner

USING GEOSPATIAL CONTEXT INFORMATION IN IMAGE PROCESSING

RELATED APPLICATIONS

This application claims the benefit of provisional patent application Ser. No. 62/007,216, filed on Jun. 3, 2014, entitled "USING GEOSPATIAL CONTEXT INFORMATION TO IMPROVE TARGET DETECTION," the disclosure of which is hereby incorporated herein by reference in its entirety.

TECHNICAL FIELD

The embodiments relate to image processing, and in particular to using geospatial context information in image processing.

BACKGROUND

Attempting to detect targets in aerial imagery is processor intensive and correspondingly relatively time-consuming. It is often necessary to perform such detection in real-time. For example, an inability to quickly detect certain targets may, in some situations, endanger a crew of a fighter aircraft. This problem is compounded as the resolution of image sensors and the images produced by such image sensors increase over time. In addition, objects can be relatively easily misidentified as targets without context of the content of the scene of the imagery. Misidentifying multiple objects as targets reduces operator confidence in the target detection system and increases a likelihood of an object being analyzed by an operator that need not be analyzed.

SUMMARY

The embodiments include mechanisms that facilitate relatively rapid and accurate target detection in aerial imagery. Generally, geospatial context information that identifies features of an environment is utilized to select portions of imagery that are most likely to contain targets. These portions of imagery are analyzed for target detection. In one embodiment, the geospatial context information is used to generate a mask that is registered to imagery of an area of the earth. The mask conceals uninteresting portions of the imagery in which targets are not likely to be located, and reveals interesting portions of the imagery in which targets are more likely to be located based on the geospatial context information. The interesting portions of the imagery may then be searched for targets. In one embodiment, a target size is utilized, based on the portion of the imagery, to limit the search to a particular number of targets.

In one embodiment, a method is provided. The method includes accessing contextual information that identifies features in an area of earth. An image of the area of the earth is accessed. A mask is generated based on the contextual information. The mask spatially corresponds to the image and identifies at least one image portion of interest in the image and at least one image portion of non-interest in the image. The at least one image portion of interest is processed to detect a target depicted in the at least one image portion of interest.

In one embodiment, the image is subdivided into a plurality of chips. A first set of chips of the plurality of chips that include the at least one image portion of interest is determined. The first set of chips is processed to generate a corresponding second set of response surface chips. The second set of response surface chips is processed to detect the target depicted in the at least one image portion of interest.

In one embodiment, generating the mask based on the contextual information further includes identifying at least one polyline context object in the contextual information. Based on the at least one polyline context object and a resolution of an image sensor from which the image is generated, a binary non-masked section that is scaled and geo-registered to the image is generated. The mask is generated based on the binary non-masked section, the mask comprising a non-masked portion defined by the binary non-masked section and a masked portion defined by a binary masked section.

In one embodiment context orientation information for the binary non-masked section that identifies an orientation of the binary non-masked section is determined. For example, the orientation may comprise one of horizontal, vertical and diagonal.

In one embodiment, it is determined that the target has a target orientation. It is determined that the target orientation is different from the orientation of the binary non-masked section. Based on determining that the target orientation is different from the orientation of the binary non-masked section, the target is identified as an anomaly on a display device.

In one embodiment, the contextual information comprises an Environmental Systems Research Institute shapefile. The contextual information comprises one or more polygon context objects that identify one or more of buildings, waterways, and land use.

In one embodiment, the contextual information comprises a plurality of polygon context objects, each polygon context object including geographical reference information that identifies a location of the each polygon context object with respect to the earth. Generating the mask based on the contextual information includes projecting each polygon context object of the plurality of polygon context objects onto the image to form the mask.

In one embodiment a target window size based on a size of a target with respect to the image is determined. A maximum number of targets is determined based on the size of the at least one portion of interest and the target window size.

In another embodiment, a system is provided. The system includes an image sensor configured to capture an image of earth. The system further includes a processor coupled to the image sensor. The processor is configured to access contextual information that identifies features in an area of the earth. The processor is further configured to generate a mask based on the contextual information. The mask spatially corresponds to the image and identifies at least one image portion of interest in the image and at least one image portion of non-interest in the image. The processor is further configured to process the at least one image portion of interest to detect a target depicted in the at least one portion of interest.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
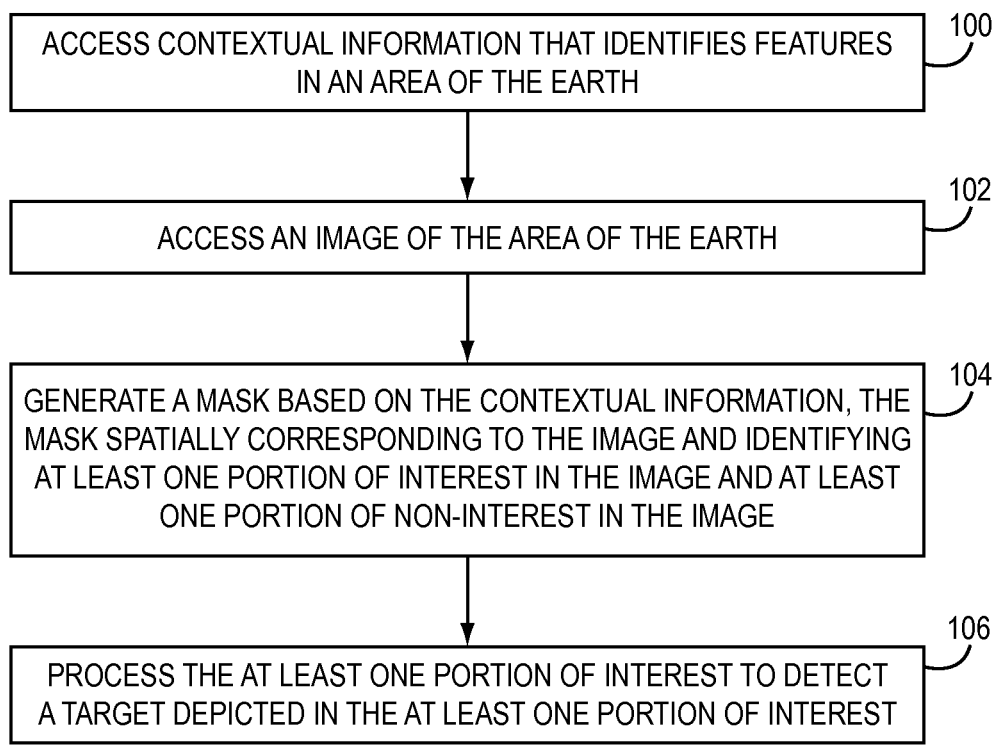
FIG. 1 is a flowchart of a method for detecting a target in imagery according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

The embodiments include mechanisms that facilitate relatively rapid and accurate target detection in aerial imagery. Generally, geospatial context information that identifies features of an environment is utilized to select portions of imagery that are most likely to contain targets. These portions of imagery are analyzed for target detection. In one embodiment, the geospatial context information is used to generate a mask that is registered to imagery of an area of the earth. The mask conceals uninteresting portions of the imagery in which targets are not likely to be located, and reveals interesting portions of the imagery in which targets are more likely to be located based on the geospatial context information. The interesting portions of the imagery may then be searched for targets. In one embodiment, a target size is utilized, based on the portion of the imagery, to limit the search to a particular number of targets.

The term "mask" is used herein in the context of a filter, wherein application of the mask to a given image will conceal some portion, or portions, of the image, and reveal another portion, or portions, of the image. In one embodiment, the mask comprises a binary bit mask, wherein the binary bit mask comprises a two-dimensional structure of bits that matches the resolution of an image sensor, detector element by detector element. Thus, each bit corresponds to a particular detector element in the image sensor, as well as a particular pixel in an image generated by the image sensor. Bits may be set to a value of 1 to indicate that the corresponding pixel will be revealed, or unmasked, and a value of 0 to indicate that the corresponding pixel will be masked, or concealed.

The term "target" as used herein refers to an object in the imagery being processed. In a military context, a target may be an object that may warrant heightened scrutiny. However, the embodiments are not limited to a military context, and have applicability in any context wherein it is desirable to relatively quickly and efficiently identify targets in aerial imagery. For example, in the context of an application that analyzes traffic, the targets may be automobiles, trucks, and other vehicles that utilize roadways.

FIG. 1 is a flowchart of a method for detecting a target in imagery according to one embodiment. Initially, contextual information is accessed that identifies features in an area of the earth (block 100). The area of the earth is the area of the earth that will be the focus of target detection. The contextual information identifies features in the respective area of the earth, such as roads, railroad tracks, waterways, buildings, points of interest, land use, and the like.

The contextual information can comprise any suitable information that identifies features in the area of the earth, and comprise any suitable form, including, for example, context files, but the embodiments are not limited to any particular type or format of contextual information. In some embodiments, the contextual information may comprise, by way of non-limiting example, information from the United States Geological Survey repository. The format of the contextual information may take any form, typically dependent on the manufacturer of the particular contextual information. In one embodiment, the format may comprise that of an Environmental Systems Research Institute shapefile.

The contextual information may comprise a plurality of context objects, wherein each context object corresponds to a feature in the area. A context object may comprise information, such as a structured array field, that provides information about a particular feature. A feature may be identified, for example, by x, y points in longitude and latitude, respectively, which facilitates subsequent registration of such features with aerial imagery, for example. Some features, such as building features, waterway features, land use features, natural features, and the like, may be identified by respective polygon context objects that identify a series of points, or lines, that define a polygon that identifies a perimeter of the respective feature.

Other features, such as roadway features and railway features, may be identified in the contextual information by a polyline context object that identifies an ordered line segment of points that form a line, sometimes referred to herein as a polyline, that identify a centerline of the respective feature. Some features may be identified by a point context object that identifies a single location in the area of the earth, such as a place. The contextual data may also include information that identifies characteristics of the features, such as a name of the feature, a time stamp that identifies a time that the contextual data was created, whether the feature is a one-way road, an intersection, and the like.

At some point in time after the contextual information is accessed, an image of the area of the earth is accessed (block 102). In one embodiment, the image is accessed immediately after being captured by an image sensor in an airborne vehicle, such as an airplane or helicopter. The image sensor may operate in any desired spectrum, including, by way of non-limiting example, the visible spectrum or the infrared spectrum. If the image sensor operates in the non-visible spectrum, output imagery of the system described herein may be colorized. While for purposes of illustration the embodiments are discussed in the context of a real-time image capturing and processing application, in other embodiments the imagery may be pre-existing.

A mask is generated based on the contextual information. The mask spatially corresponds to the image and identifies at least one image portion of interest in the image and at least one image portion of non-interest in the image (block 104). The generation of an example mask will be discussed below in greater detail.

The at least one portion of interest is processed to detect a target depicted in the at least one image portion of interest (block 106). Subsequent processing may then occur, such as the presentation of the imagery to an operator with one or more targets annotated in the imagery. Alternatively, or supplementally, such imagery may be provided to additional downstream processing for higher-level reasoning algorithms to determine activity-based intelligence, alert an individual to a potential problem situation, or the like.

Figure 2:
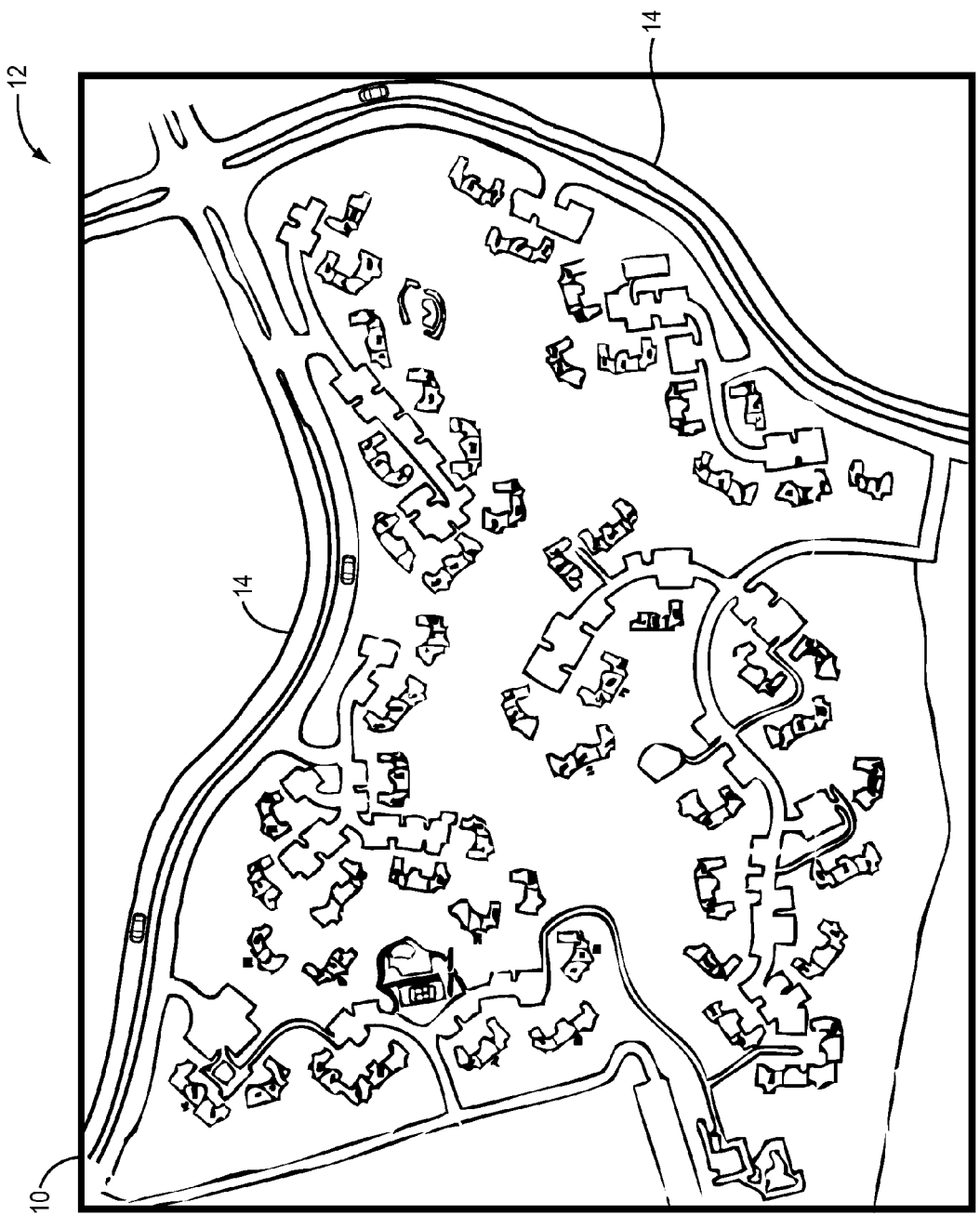
FIG. 2 is a diagram of an image of an area of the earth, according to one embodiment.

FIG. 2 is a diagram of an image 10 of a portion of an area 12 of the earth, according to one embodiment. In particular, the image 10 depicts that portion of the area 12 within a field of view of an image sensor, and the area 12 may be substantially larger or smaller than that depicted in the image 10. The image 10 depicts a feature 14 contained in the area 12, in this example the feature 14 is a roadway. While for purposes of illustration only a single feature 14 is illustrated in FIG. 2, the area 12 may contain hundreds or thousands of features 14.

Figure 3C:
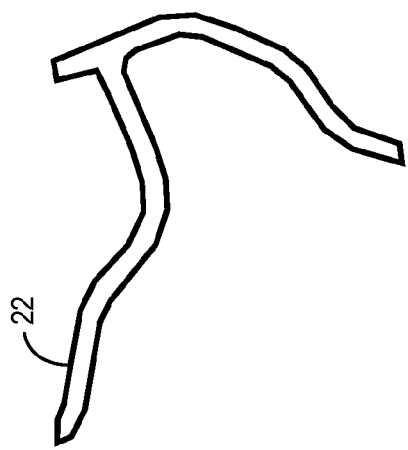
FIGS. 3A-3C are diagrams that illustrate a process for generating a polygon context object from a polyline context object, which may then be scaled and geo-registered to an image, for purposes of making a mask, according to one embodiment.
Figure 3B:
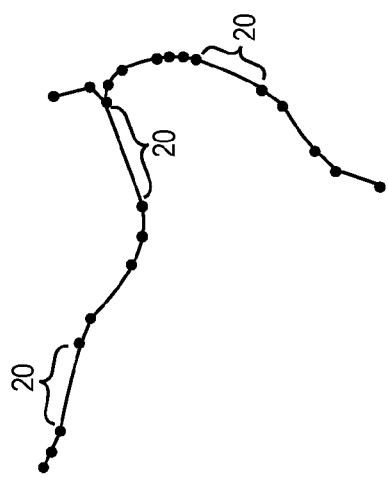
Figure 3A:
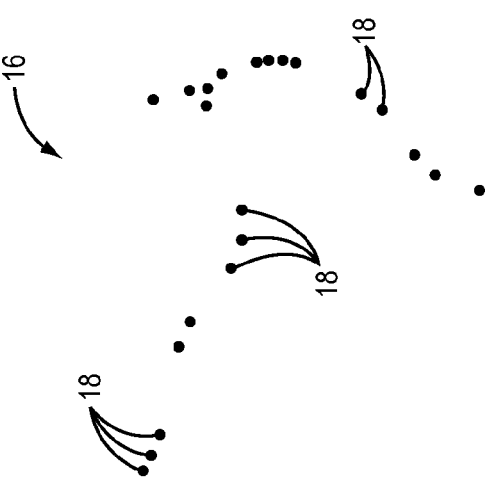

FIGS. 3A-3C are diagrams that illustrate a process for generating a polygon context object from a polyline context object, which may then be scaled and geo-registered to the image 10, for purposes of making a mask, according to one embodiment. FIGS. 3A-3C will be discussed in conjunction with FIG. 2. Referring first to FIG. 3A, a context file containing contextual information that identifies features in the area 12 is accessed. In this example, the context file comprises a polyline context object 16, which comprises a plurality of points 18 (only some points 18 are individually labelled for purposes of clarity). Each point 18 identified in the contextual information may include location information, such as latitude and longitude information, that identifies the particular location of the respective point 18 with respect to the area 12 of the earth. FIG. 3A visually depicts the relative locations of such points 18 based on such location information.

In one embodiment, a coordinate system (CS) polyline context object 16 may be generated from the polyline context object 16 by converting, or translating, the latitude and longitude values of the points 18 of the polyline context object 16 into a particular coordinate system. Any suitable coordinate system may be used, such as, by way of non-limiting example, the Earth-Centered Earth-Fixed (ECEF) coordinate system (sometimes referred to as the Earth Centered Rotational coordinate system) or the North east down coordinate system (sometimes referred to as the local tangent plane coordinate system). The coordinate system may utilize any desired units, such as feet, yards, or meters, for example.

FIG. 3B illustrates the determination of a set of points 20 that connects each point 18. The set of points 20 are illustrated as line segments between the points 18, but each line segment may in practice comprise individual points at a particular resolution in a particular pixel space. The phrase "pixel space," as used herein, refers to a resolution of a particular image sensor. The particular pixel space may comprise that of the resolution of the image sensor that captured the image 10, or may comprise a reference resolution, such as that of satellite imagery that exists of the area 12. The set of points 20 may be determined in any desired manner. In one embodiment, a dominant horizontal span or vertical span of a pair of contiguous points 18 is determined. References herein to orientation, such as horizontal orientation or vertical orientation, are with respect to a reference orientation. If the span is dominantly horizontal the following equation may be used:

$$y-y0-[(y1-y0)/(x1-x0)]*(x-x0)=0 =>y=y0-[(y1-y0)/(x1-x0)]*(x-x0)$$

where (x0,y0) and (x1,y1) represent the current contiguous pair of points 18 in a particular pixel space. Y and x represent any intermediate point between the pair of points 18.

If the span is dominantly vertical the following equation may be used:

$$y-y0-[(y1-y0)/(x1-x0)]*(x-x0)=0 =>x=x0+[(x1-x0)/(y1-y0)]*(y-y0),$$

where (x0,y0) and (x1,y1) represent the current contiguous pair of points 18 in the particular pixel space. Y and x represent any intermediate point between the pair of points 18.

The set of points 20 and the points 18 may then be dilated, or expanded, a desired width to match the width of the feature represented by the polyline context object 16 to generate a polygon context object. The polygon context object can then be used to generate a binary non-masked section that corresponds to the feature 14. For example, the contextual information may identify the feature 14 as a 2 lane road of a certain width. Alternatively, a certain width may be assumed based on the particular feature. For example, it may be assumed that all roads have a width of 10 meters. Based on the scale of each pixel in the respective pixel space, a binary non-masked section is generated that matches the feature 14. The orientation, such as horizontal, vertical, or diagonal, as determined above, may be stored in conjunction with the binary non-masked section for subsequent use in target detection, as discussed subsequently herein.

FIG. 3C illustrates such a binary non-masked section 22. Note that the binary non-masked section 22 closely approximates the feature 14 of the area 12 depicted in the image 10 (FIG. 1). Note also that the binary non-masked section 22 may or may not, at this point, be scaled to the image 10. In particular, if the pixel space utilized with reference to FIGS. 3A-3C was the pixel space of the image sensor used to take the image 10, then the binary non-masked section 22 may be scaled to the image 10. The binary non-masked section 22 may be geo-registered to the image 10 by utilizing the coordinate system locations of the binary non-masked section 22 and the coordinate system locations of the image 10. While for purposes of illustration, only a single binary non-masked section 22 has been discussed, it should be appreciated that a binary non-masked section 22 may be generated for each feature 14 identified in the contextual information.

In some embodiments, the binary non-masked section 22 may be generated in advance of the capturing of the image 10. In such embodiments, the binary non-masked section 22 may be stored, along with sufficient information, such as appropriate coordinates and scale, such that the binary non-masked section 22 can be subsequently used to generate a mask for the image 10 in real-time. Generating the binary non-masked section 22 in advance eliminates the need to generate the binary non-masked section 22 during real-time processing of the image 10. This may be particularly advantageous where there are hundreds or thousands of features 14 and corresponding binary non-masked sections 22 associated with the area 12. During the real-time processing, the binary non-masked section 22 need only be scaled to the particular pixel space of the image sensor used to capture the image 10, and geo-referenced to the image 10, operations that utilize substantially less time and processing than that necessary to generate the binary non-masked section 22.

Figure 4:
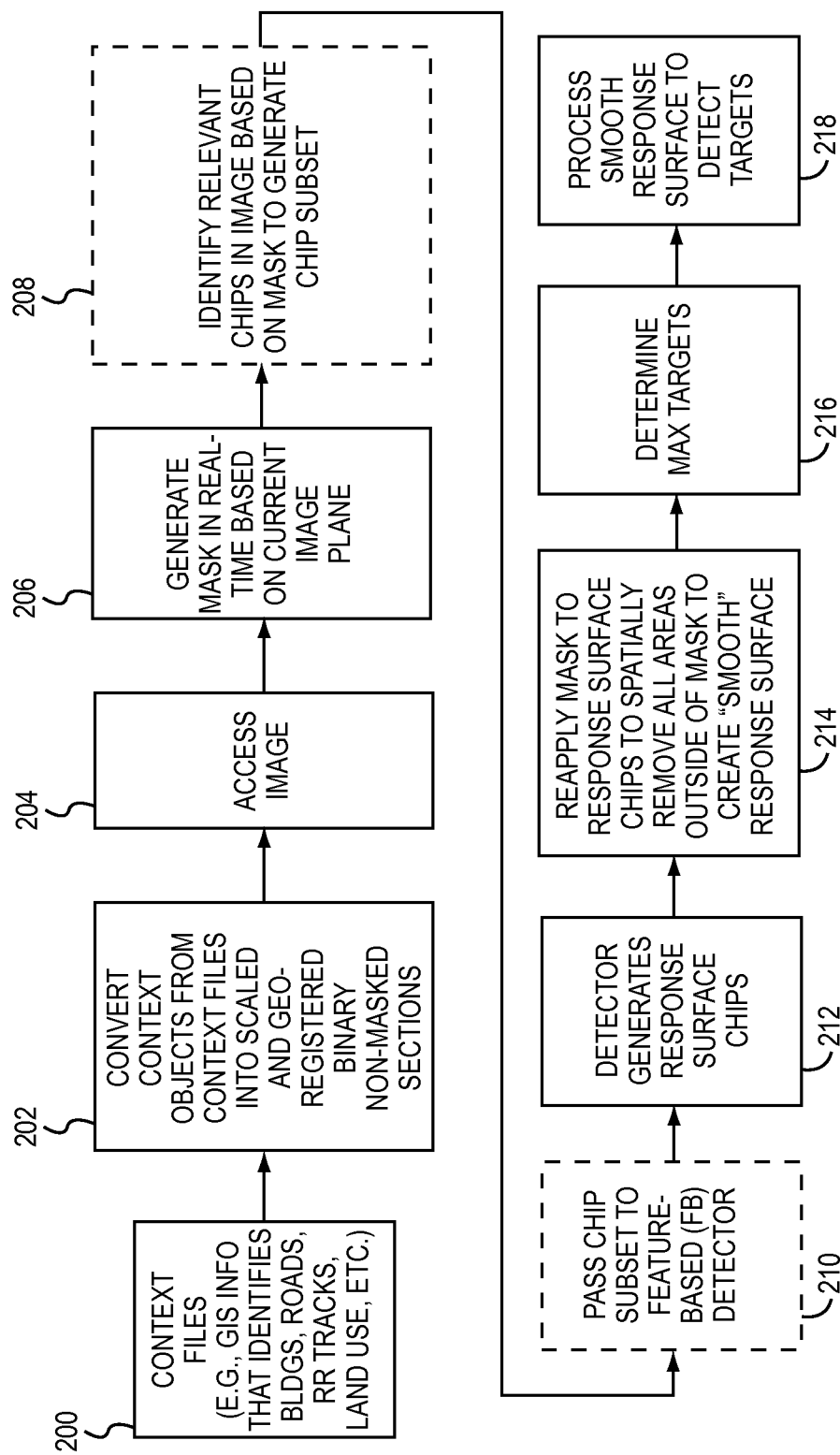
FIG. 4 is a diagram illustrating a process for detecting a target according to another embodiment.

FIG. 4 is a diagram illustrating a process for detecting a target according to another embodiment. The process illustrated in FIG. 4 will be discussed with regard to FIG. 2, and substantially all of the processing discussed above with regard to FIGS. 2 and 3A-3C are implemented in the process discussed with regard to FIG. 4. Initially, one or more context files are accessed that identify features 14 in the area 12 (block 200). Each context object in a context file is converted into a corresponding scaled and geo-registered binary non-masked section 22, as discussed above with regard to FIGS. 3A-3C (block 202).

An image, such as the image 10 (FIG. 2), is accessed (block 204). The location of the area 12 of the earth depicted in the image is determined. Such information may be provided, for example, by the image generation system used to capture the image 10. The binary non-masked sections 22 that correspond to the area 12 of the earth are determined, and a mask is generated based on such binary non-masked sections 22, and the image plane associated with the image sensor used to generate the image 10. The process described herein regarding the initial processing of a context object and ultimate scaling and geo-referencing of the context object to an image to form a mask may be referred to herein as projecting the polygon context objects onto the image to form the mask. The mask spatially corresponds to the image 10 and identifies a portion of interest in the image for each area of the image that spatially corresponds to a binary non-masked section 22, and a portion of non-interest in the image for each area of the image that does not spatially correspond to a portion of the binary non-masked section 22.

In one embodiment, the image 10 may be subdivided into a plurality of image sections, referred to herein as chips. In embodiments where feature-based (FB) detectors are used, the mask may be utilized to identify a subset of the chips that contain a portion of interest in accordance with the mask (block 208). FB detectors process imagery to identify image features such as edges of items in the image, intensity features, and transformed representations of the same. FB detectors may process the imagery to transform or convolve the imagery to aid in the identification of such image features. The chip subset may then be passed to an FB detector (block 210). The detector generates a subset of response surface chips based on the chip subset (block 212). The response surface chips are generated by processing the corresponding chips in the subset of chips with a correlation, convolution, or other transformed domain equivalent process (e.g., a Fourier Transform, a Wavelet Transform, or the like) to aid in the identification of image features. The mask may then be reapplied to the response surface chips to remove all areas of the image 10 outside a binary non-masked section to create a smooth response surface image (block 214). In one embodiment, as will be discussed in greater detail herein, a maximum number of targets may be determined based on the size of the smooth response surface image and a size of a target window (block 216). The smooth response surface image may then be processed to detect one or more targets depicted in the smooth response surface image (block 218). In some embodiments, the original imagery may be presented on a display device with annotations highlighting the identified targets.

The process discussed above with regard to FIG. 4 will now be discussed in greater detail. The process will be illustrated with reference to the image 10 and portion of the area 12 of the earth illustrated in FIG. 2. Assume that, as described above with regard to FIGS. 3A-3C, the binary non-masked section 22 has been generated based on contextual information associated with the area 12. Assume further that the binary non-masked section 22 is not scaled to the image 10, but was generated based on different reference imagery, such as satellite imagery. The pixel space of the image sensor used to capture the image 10 is determined. The coordinates of the locations of the four corners of the image 10 is also determined. In some embodiments, the coordinates of the locations of the four corners of the image 10 include metadata such as line-of-sight intersection vectors that correspond to a particular non-ellipsoidal or ellipsoidal earth representation model such as the WGS84 Ellipsoid, and include metadata such as the image sensor resolution. Such information may be determined, by way of non-limiting example, by on-board altitude and roll, pitch and yaw sensors. In some embodiments, image metadata may include geo-registered earth locations that correspond to particular pixel locations of the image 10. The binary non-masked section 22 is then scaled and geo-registered with the image 10 based on the pixel space of the image sensor, the original pixel space associated with the binary non-masked section 22 (in this example, that of the satellite imagery), the coordinate system locations (such as ECEF locations) of the binary non-masked section 22 and the coordinate system locations of the image 10, as discussed above in block 206 of FIG. 4.

Figure 5:
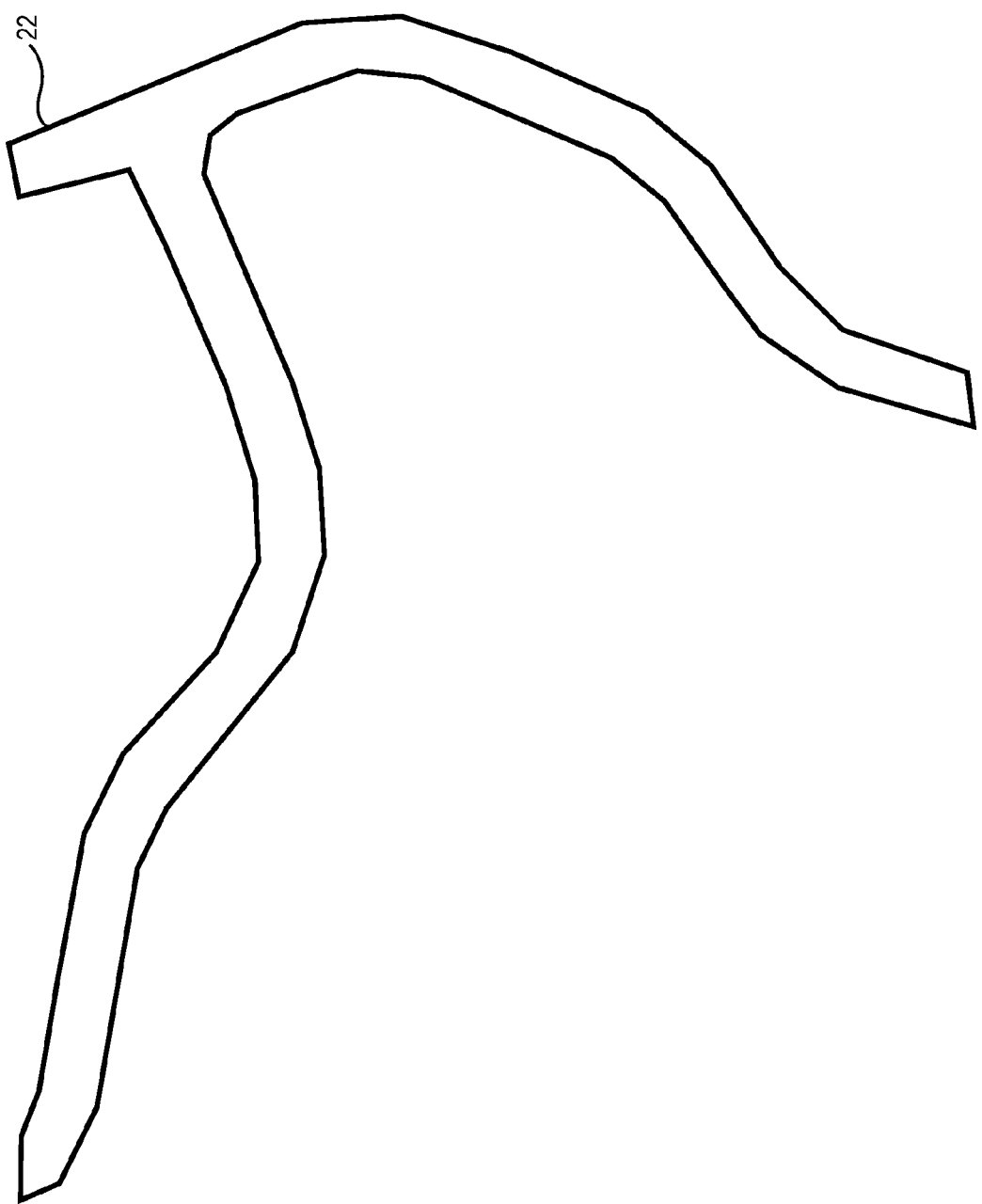
FIG. 5 illustrates a binary mask section scaled to the image according to one embodiment.
Figure 6:
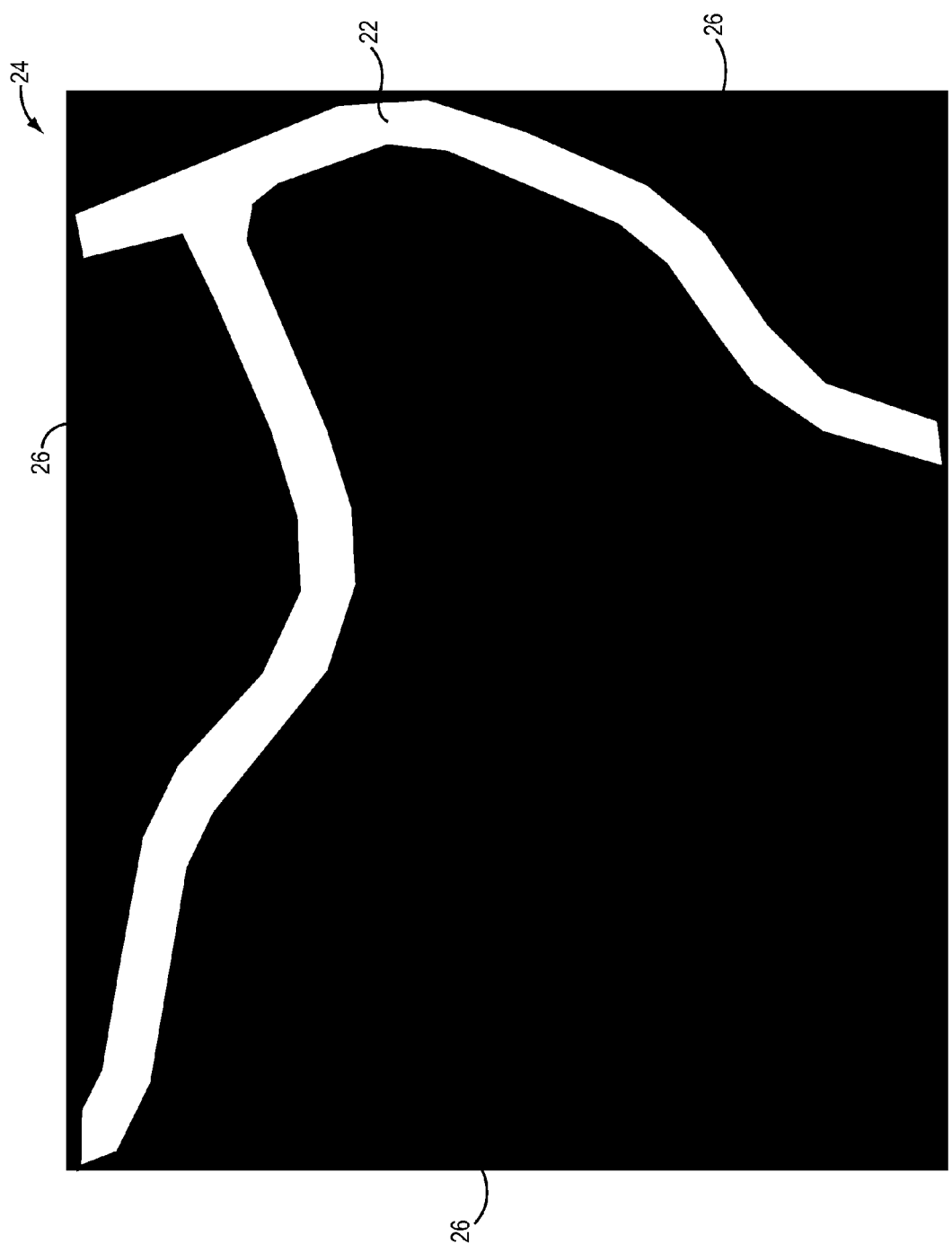
FIG. 6 illustrates a mask generated based on the binary non-masked section illustrated in FIG. 5, according to one embodiment.

FIG. 5 illustrates the binary non-masked section 22 scaled and geo-registered to the image 10 according to one embodiment. FIG. 6 illustrates a mask 24 generated based on the binary non-masked section 22, according to one embodiment. The mask 24 contains the binary non-masked section 22, and multiple binary masked sections 26. The mask 24 may be applied to the image 10. The binary non-masked section 22 identifies a portion of interest in the image 10, in this example the feature 14 (FIG. 2), and the binary masked sections 26 identify image portions of non-interest, in this example, everything but the feature 14. It should be noted that the mask 24 is visually depicted as black and white sections, but in practice, the mask 24, in one embodiment, comprises a two-dimensional structure of cells that has a same number of rows and columns as that of the detector elements in the image sensor used to capture the image 10. Each cell corresponds to a detector element that corresponds to the same column and row in the image sensor. Each cell that is spatially within the binary non-masked section 22 may have a value, such as a 1, and each cell that is in the binary masked sections 26 may have a different value, such as 0. In one embodiment, the pixels in the image 10, which correspond to the detector elements in the image sensor that captured the image 10, and to the cells in the mask 24, may be Boolean "AND"ed with the corresponding cell in the mask 24 to generate an image that contains only that portion of the image contained within the binary non-masked section 22.

Figure 7:
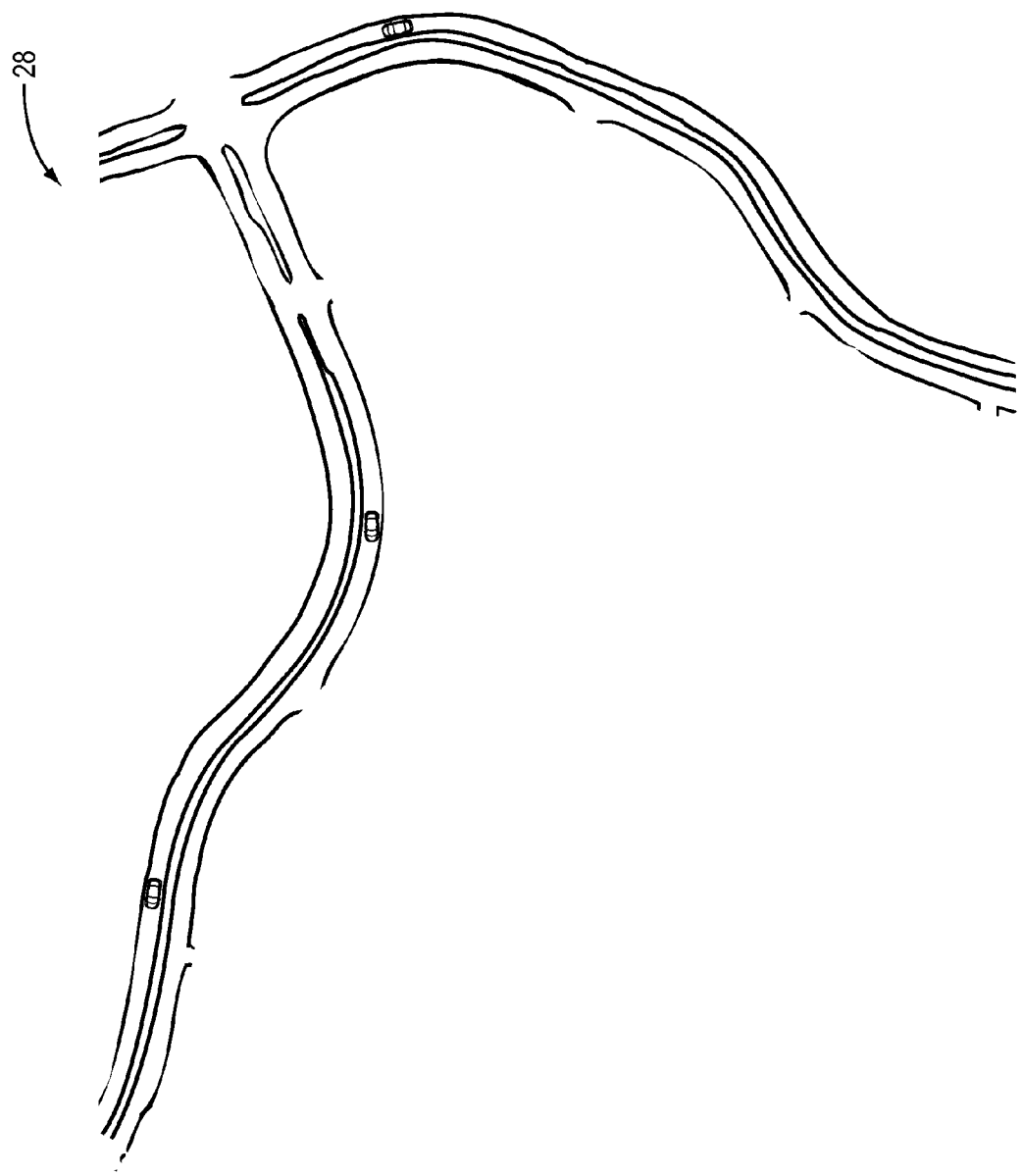
FIG. 7 illustrates an image portion of interest generated from the image illustrated in FIG. 2 after application of the mask illustrated in FIG. 6 to the image.

FIG. 7 illustrates an image portion of interest 28 generated from the image 10 after application of the mask 24 to the image 10.

Figure 8:
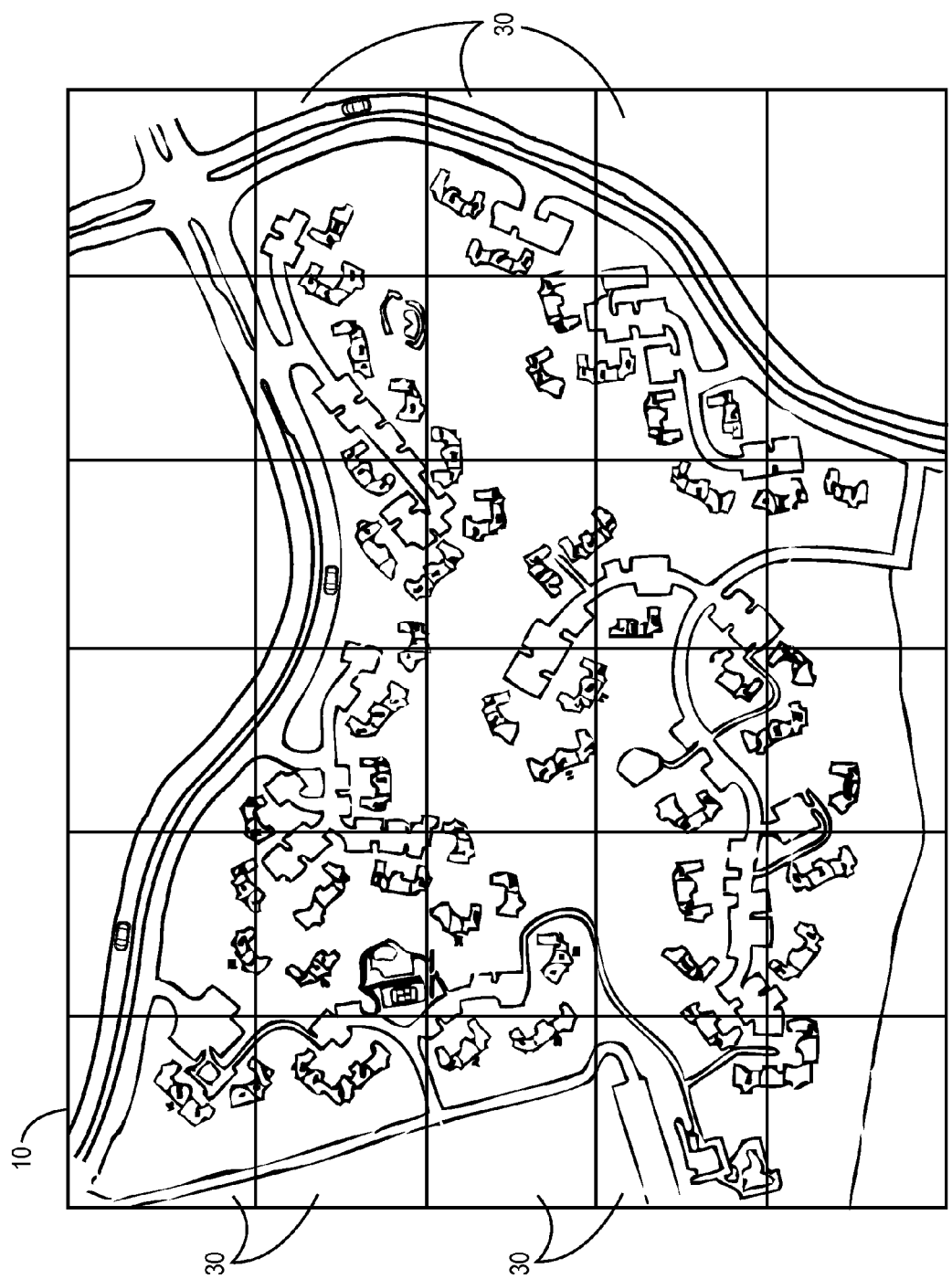
FIG. 8 illustrates the image subdivided into a plurality of chips, according to one embodiment.
Figure 9:
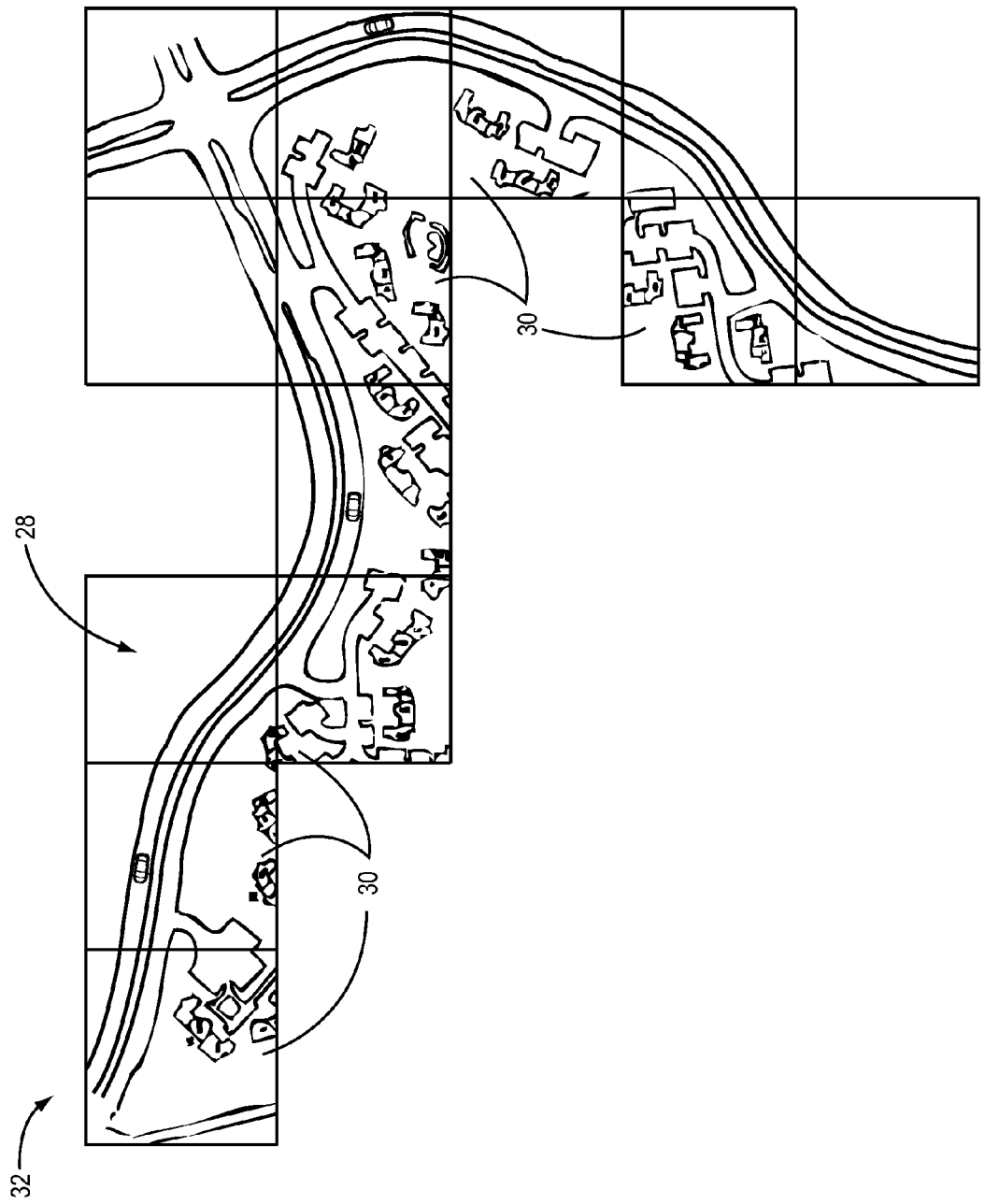
FIG. 9 illustrates a set of chips that include the portion of interest of the image.
Figure 10:
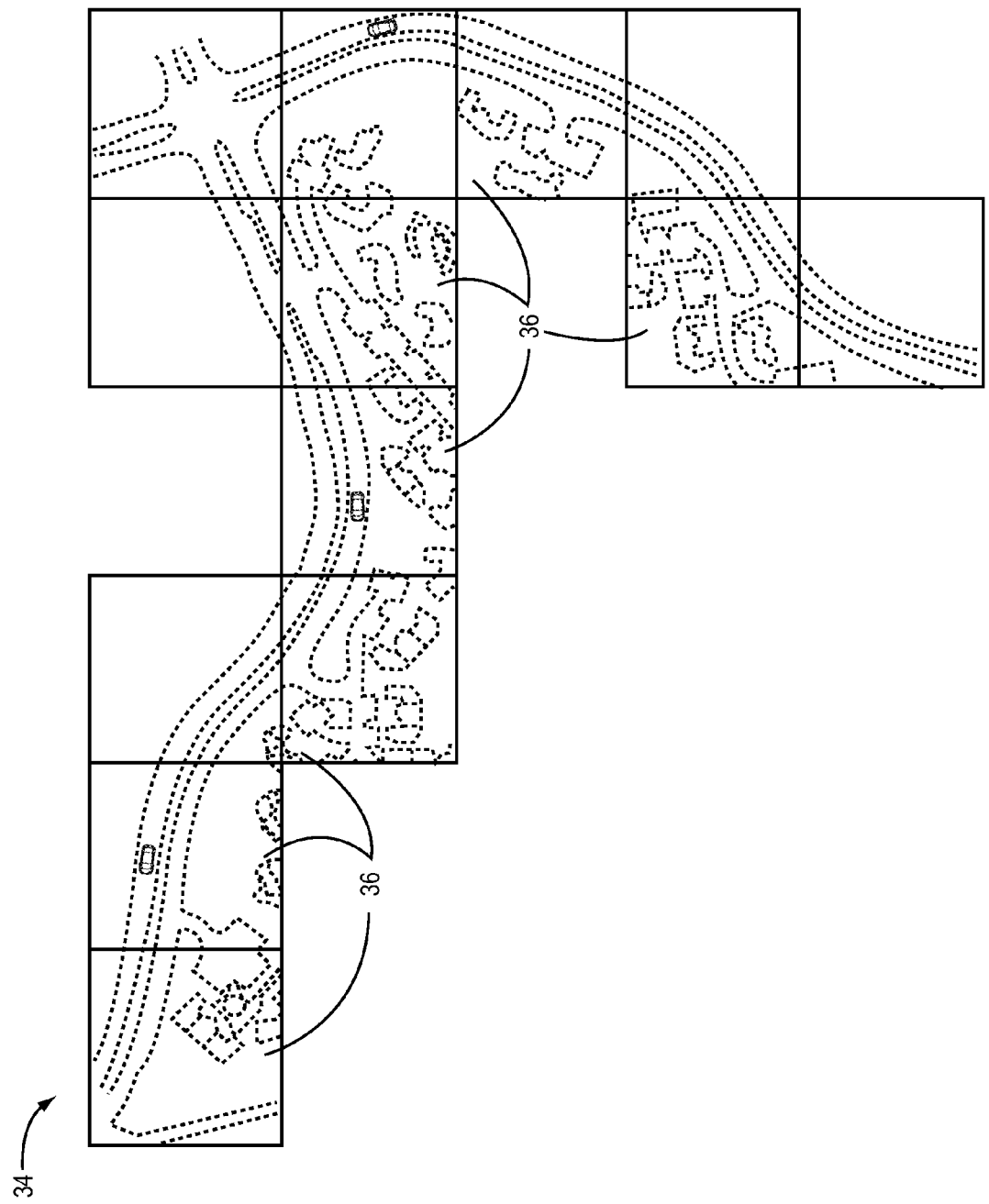
FIG. 10 visually depicts a set of response surface chips generated by a feature-based detector from the set of chips, according to one embodiment.

FIG. 8 illustrates the image 10 subdivided into a plurality of image sections, referred to herein as chips 30. Each chip 30 may be a same size, such as 128 pixels by 128 pixels, or any other desired size. FIG. 9 illustrates a set 32 of chips 30 that include the portion of interest 28 of the image 10. The set 32 comprises those chips 30 that contain any imagery of the portion of interest 28. FIG. 10 visually depicts a set 34 of response surface chips 36 generated by a FB detector from the set 32 of chips 30. As discussed above, while for purposes of illustration the set 34 of response surface chips 36 is visually depicted as dashed imagery, the response surface chips 36 comprise the chips 30 after the FB detector has performed a correlation, convolution, or other transformed domain equivalent process on the chips 30.

Figure 11:
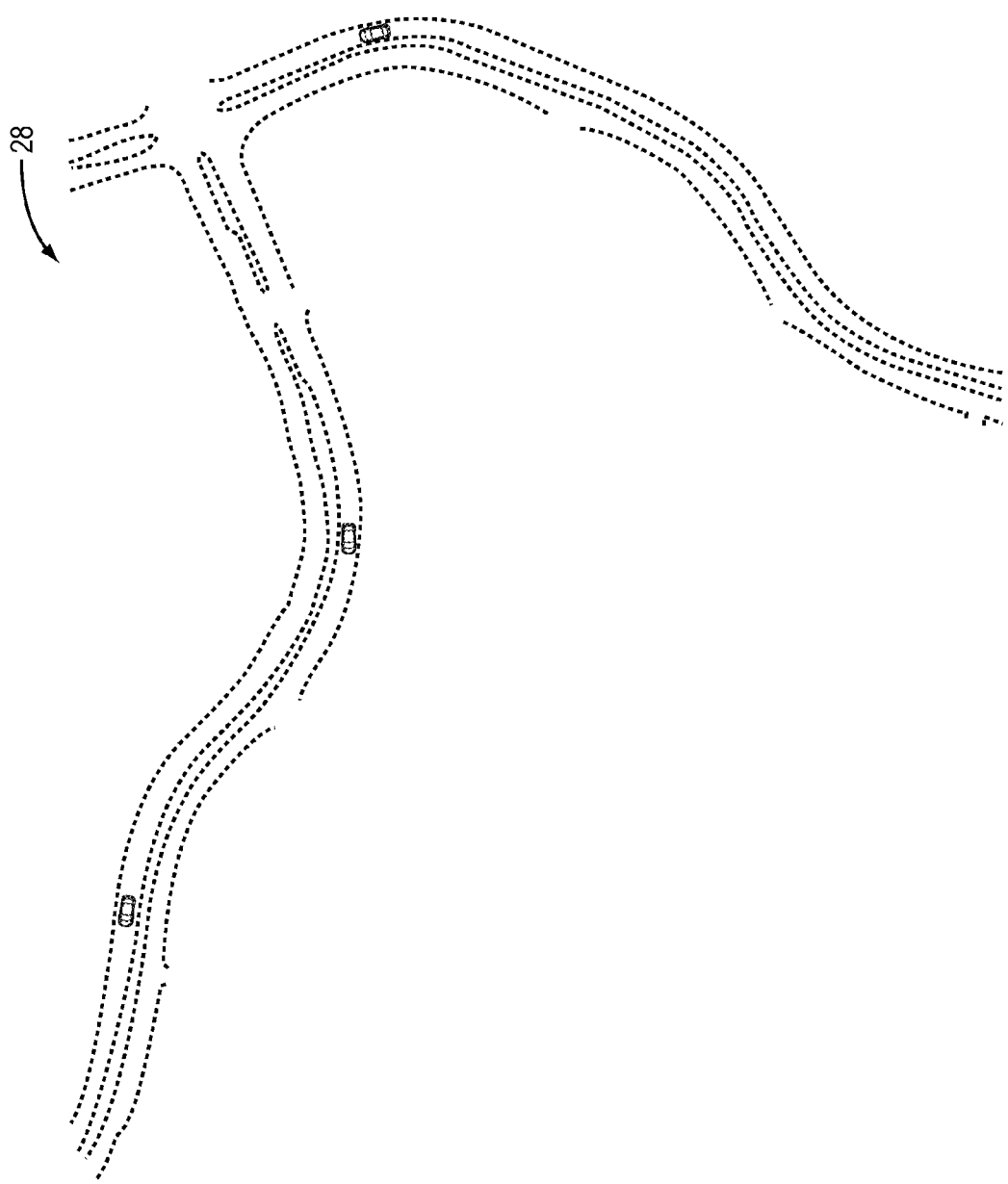
FIG. 11 illustrates the portion of interest of the image extracted from the set of the response surface chips after the mask has been applied to the response surface chips, according to one embodiment.

FIG. 11 illustrates the portion of interest 28 of the image 10 extracted from the set 34 of the response surface chips 36 after the mask 24 has been applied to the response surface chips 36. Thus, the mask 24 may be used to eliminate portions of non-interest from the response surface chips 36 prior to processing the response surface chips 36 to detect targets.

Figure 12:
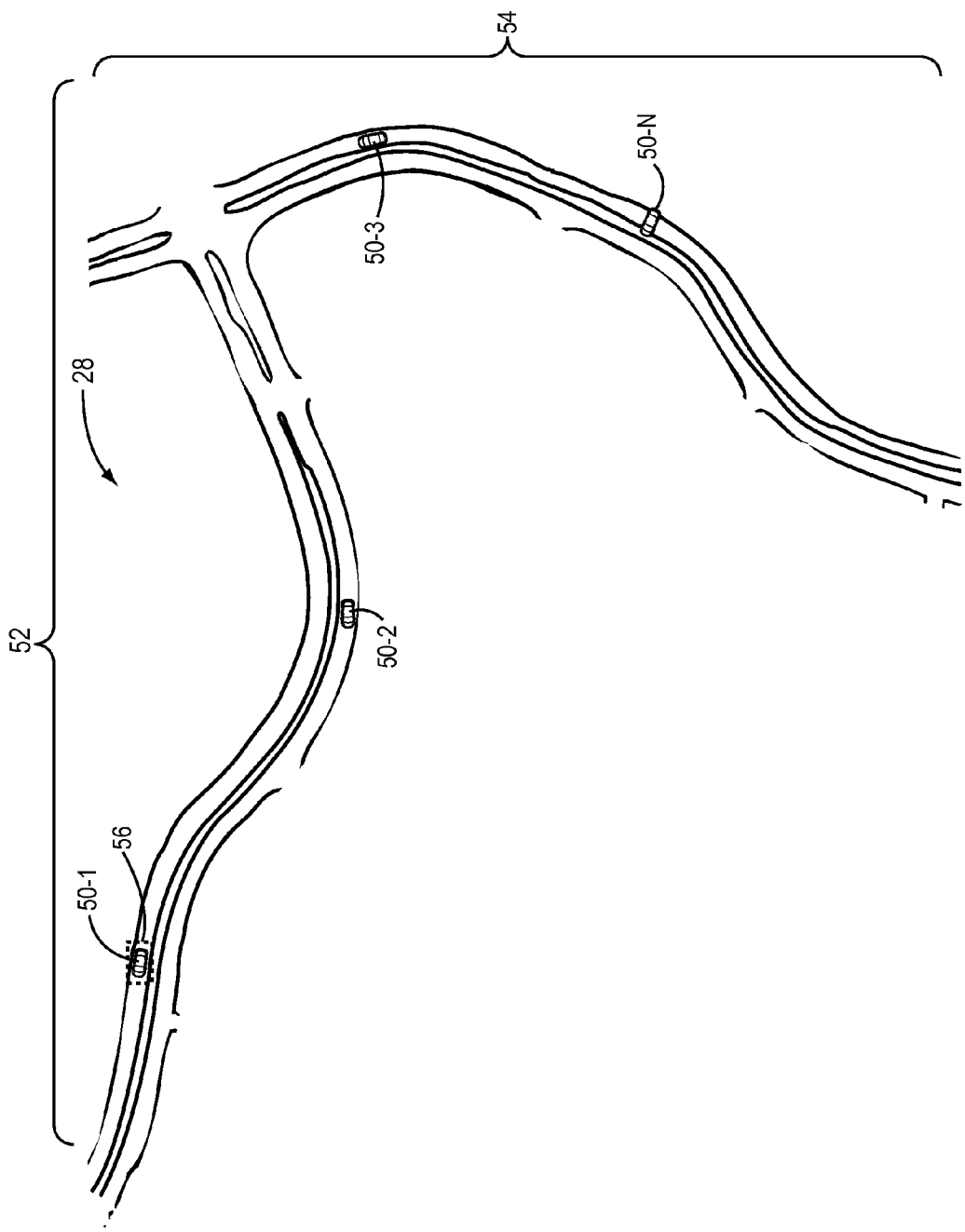
FIG. 12 illustrates the portion of interest of the image and potential targets, according to one embodiment.

FIG. 12 illustrates the portion of interest 28 of the image 10 and a plurality of potential targets 50-1-50-N. In one embodiment, the system implements a detection-throttling feature based on a target window size and a size of the portion of interest 28. In particular, a pixel space occupied by the portion of interest 28 is first determined. The pixel space comprises the number of pixels that make up the portion of interest 28. Assume that the portion of interest 28 comprises 205,000 pixels. A target window size is determined. The target window size may differ depending on the particular targets that are sought and/or based upon the local image area effective ground sampling distance (e.g., the metric relationship of objects to the shape and size of their observation as imaged and represented by pixels, particularly when the image is non-nadir). Assume that the target window size comprises a 45 by 45 pixel window. A 45 by 45 pixel window comprises 2025 pixels. 205,000 pixels divided by 2025 pixels is approximately 102. Thus, in this example, the detector may be limited to detecting a maximum of 102 targets in the portion of interest 28.

In some embodiments, the context orientation information discussed above may be used in the detection of targets. The portion of interest 28 contains a generally horizontal section 52 and a generally vertical section 54. Assume that a type of vehicle that occupies an oblong 25 by 45 pixel window 56 having a long axis and short axis may be sought. Assume that the target 50-1 is detected at a location in the image 10. The pixel window 56 may be centered over the center of mass of the target 50-1 in an orientation consistent with the horizontal section 52, such that the long axis of the pixel window 56 is horizontal. All pixels in the portion of interest 28 that fall within the pixel window 56 are then identified as "suppressed" such that the location area within the pixel window 56 is not subsequently revisited as a target candidate.

In another embodiment, the orientation information may be used to quickly detect anomalous situations. For example, the target 50-N may be detected in the vertical section 54 of the portion of interest 28. It may be determined that the target orientation of the target 50-N is horizontal, and thus inconsistent with the vertical orientation of the vertical section 54. Based on determining that the target orientation of the target 50-N is different from the orientation of the vertical section 54, the target 50-N may then be identified an as an anomaly on a display device. For example, the imagery may be presented on the display device and highlighted or annotated in some manner to indicate an anomalous situation that may warrant immediate consideration.

In some embodiments, a moving target indicator detector is utilized. A moving target indicator detector often utilizes a temporal differencing technique applied to registered and/or stabilized images. When the moving target indicator detector evaluates a set of input images, the moving target indicator detector produces a result that is effectively a difference image and is henceforth referred to as a response surface. The embodiments also have broad applicability for use with such a moving target indicator detector. For example, a mask may be generated, as discussed above, based on contextual information. The mask may be used to spatially filter the response surface of the moving target indicator. Among other features, this facilitates control of detection densities by forcing the response surfaces to only look interesting in areas that spatially correspond to the context masks used. The detection-throttling process discussed above may also be applied to return only N target candidates from the spatially non-masked moving target indicator response surface.

A moving target indicator detector operates by registering multiple consecutive images taken of an area over a period of time with respect to one another, and identifying the differences between the consecutive images. One challenge to such registration/stabilization is the effects caused by parallax of certain features, such as, by way of non-limiting example, relatively tall structures in urban or industrial areas. Such relatively tall buildings can result in erroneous identification of feature points in the images, inhibiting the operation of the moving target indicator detector. In some embodiments, features likely to cause parallax problems may be masked to eliminate the problems caused by parallax. For example, each context object that identifies a feature that is over a threshold height may be removed from the set of context objects that would otherwise be projected into the image plane to derive a subset of context objects. The subset of context objects is then projected into the image plane. In this manner, such context objects are not used to generate binary non-masked sections 22, and the underlying features are then ultimately masked out, eliminating or greatly reducing the parallax problem otherwise caused by such features.

Figure 13:
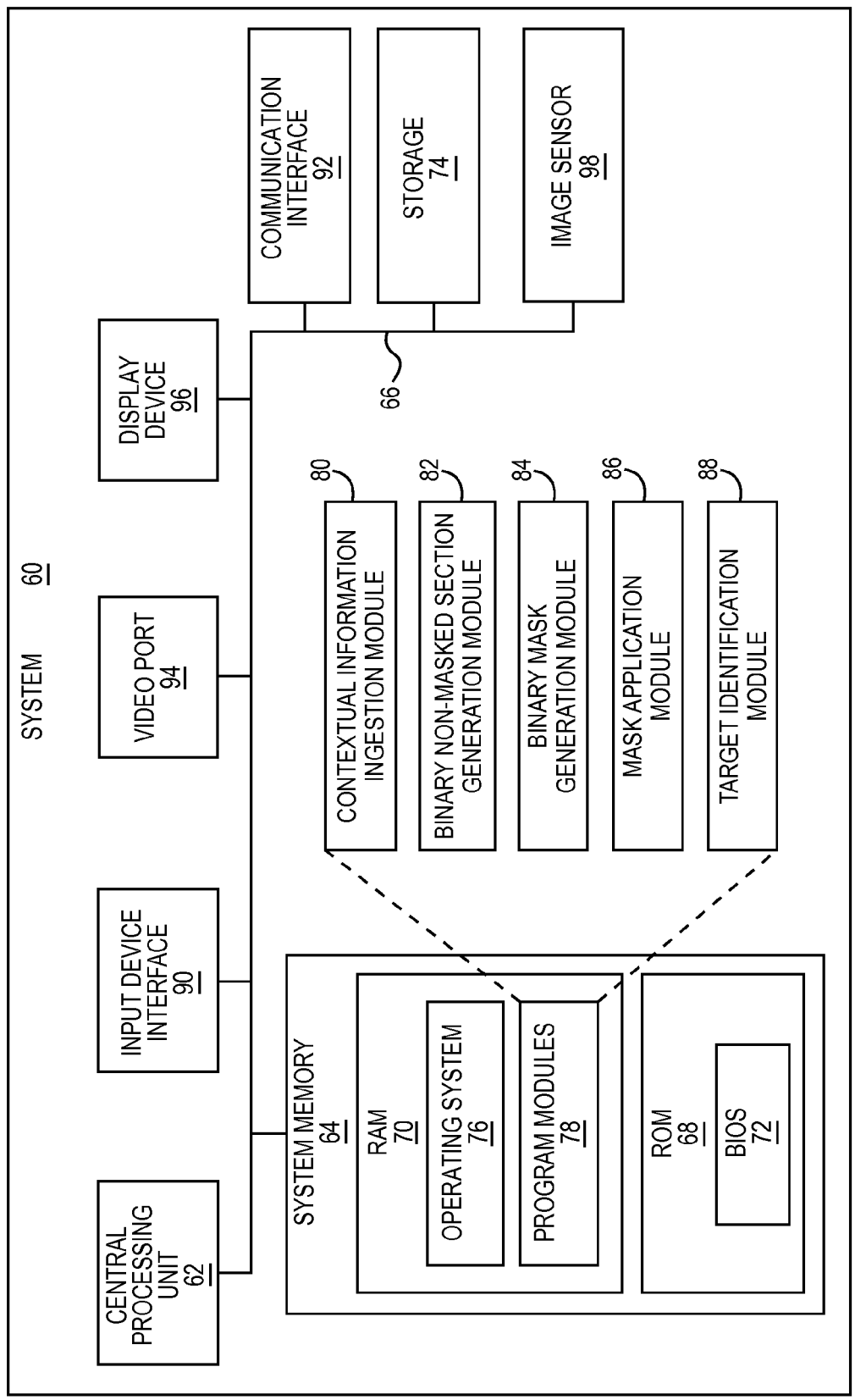
FIG. 13 is a block diagram of a system suitable for implementing the embodiments, according to one embodiment.

FIG. 13 is a block diagram of a system suitable for implementing the embodiments. The system 60 may comprise any computing or processing device, or combination of devices, capable of implementing the functionality described herein. In one embodiment, the system 60 includes at least one central processing unit 62, a system memory 64, and a system bus 66. The system bus 66 provides an interface for system components including, but not limited to, the system memory 64 and the central processing unit 62. The central processing unit 62 can be any commercially available or proprietary processor.

The system bus 66 may be any of several types of bus structures that may further interconnect to a memory bus (with or without a memory controller), a peripheral bus, and/or a local bus using any of a variety of commercially available bus architectures. The system memory 64 may include non-volatile memory 68 (e.g., read only memory (ROM), erasable programmable read only memory (EPROM), electrically erasable programmable read only memory (EEPROM), etc.) and/or volatile memory 70 (e.g., random access memory (RAM)). A basic input/output system (BIOS) 72 may be stored in the non-volatile memory 68, and can include the basic routines that help to transfer information between elements within the system 60. The volatile memory 70 may also include a high-speed RAM, such as static RAM for caching data.

The system 60 may further include or be coupled to a computer-readable storage 74, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 74 and other drives, associated with computer-readable media and computer-usable media, may provide non-volatile storage of data, data structures, and computer-executable instructions that configure the central processing unit 62 to implement all or part of the functionality described herein. Among other data, the computer-readable storage 74 may store, for example, context files that contain contextual information for the relevant area of the earth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of modules can be stored in the computer-readable storage 74 and in the volatile memory 70, including an operating system 76 and one or more program modules 78, which may implement the functionality described herein in whole or in part, including, for example the ability to generate masks, generate response surface chips, perform target identification, and the like.

In one embodiment, the program modules 78 may include a contextual information ingestion module 80 that is configured to access contextual information as described, for example, with regard to block 100 of FIG. 1. A binary non-masked section generation module 82 is configured to generate binary non-masked sections 22, as described, for example, with regard to FIGS. 3A-3C. A binary mask generation module 84 is configured to generate the mask 24, as described, for example, with regard to FIG. 6. A mask application module 86 is configured to apply the mask 24 to imagery, as described, for example, with regard to FIGS. 7-9. A target identification module 88 is configured to process a portion of interest of an image and detect targets, as described, for example, with regard to FIG. 12. While the modules 80-88 may comprise complex software instructions that, when executed on central processing unit 62 configure the central processing unit 62 to implement the functionality described herein, in other embodiments, the modules 80-88 may comprise firmware, application specific integrated circuits, floating point gate arrays, or any combination of the above.

All or a portion of the embodiments may be implemented as a computer program product stored on a transitory or non-transitory computer-usable or computer-readable storage medium, such as the computer-readable storage 74, which includes complex programming instructions, such as complex computer-readable program code, configured to cause the central processing unit 62 to carry out the steps described herein. Thus, the computer-readable program code can comprise software instructions for implementing the functionality of the embodiments described herein when executed on the central processing unit 62. The central processing unit 62, in conjunction with the program modules 78 in the volatile memory 70, may serve as a controller for the system 60 that is configured to, or adapted to, implement the functionality described herein.

The system 60 may include a keyboard (not illustrated), a pointing device such as a mouse (not illustrated), or a touch-sensitive surface (not illustrated). Such input devices may be connected to the central processing unit 62 through an input device interface 90 that is coupled to the system bus 66, but can be connected by other interfaces such as a parallel port, an Institute of Electrical and Electronic Engineers (IEEE) 1394 serial port, a Universal Serial Bus (USB) port, an IR interface, and the like.

The system 60 may also include a communication interface 92, suitable for communicating with a network or other devices. The system 60 may also include a video port 94 configured to interface with a display device 96, to provide a user, such as an operator, of target information and the like.

The system 60 may also include an image sensor 98 configured to take real-time imagery of an area of interest, as discussed herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   accessing, by a processor device, contextual information that identifies features in an area of earth;
   accessing, by the processor device, an image of the area of the earth;
   generating, by the processor device, a mask based on the contextual information, the mask spatially corresponding to the image and identifying at least one image portion of interest in the image and at least one image portion of non-interest in the image, wherein generating the mask based on the contextual information comprises:
   identifying at least one polyline context object in the contextual information;
   generating, based on the at least one polyline context object and a resolution of an image sensor from which the image is generated, a binary non-masked section that is scaled and geo-registered to the image; and
   generating the mask based on the binary non-masked section, the mask comprising a non-masked portion defined by the binary non-masked section and a masked portion defined by a binary masked section; and processing, by the processor device, the at least one image portion of interest to detect a target depicted in the at least one image portion of interest.

2. The method of claim 1, further comprising:
subdividing the image into a plurality of chips;
determining a first set of chips of the plurality of chips that include the at least one image portion of interest;
processing the first set of chips to generate a corresponding second set of response surface chips; and
wherein processing the at least one image portion of interest to detect the target depicted in the at least one image portion of interest further comprises processing the second set of response surface chips to detect the target depicted in the at least one image portion of interest.

3. The method of claim 2, wherein at least some response surface chips of the second set of response surface chips contain imagery that includes some of the at least one image portion of interest and some of the at least one image portion of non-interest, and further comprising:
processing the at least some of the response surface chips based on the mask to eliminate the at least one image portion of non-interest from the at least some of the response surface chips prior to processing the response surface chips to identify the target.

4. The method of claim 2, wherein processing the first set of chips to generate the second set of response surface chips comprises processing, by a feature-based detector, the first set of chips to generate the second set of response surface chips.

5. The method of claim 1, further comprising determining context orientation information for the binary non-masked section that identifies an orientation of the binary non-masked section.

6. The method of claim 5, wherein the orientation comprises one of horizontal, vertical and diagonal.

7. The method of claim 5, further comprising:
determining that the target has a target orientation;
determining that the target orientation is different from the orientation of the binary non-masked section; and
based on determining that the target orientation is different from the orientation of the binary non-masked section, identifying the target as an anomaly on a display device.

8. The method of claim 1, wherein the contextual information comprises an Environmental Systems Research Institute shapefile.

9. The method of claim 1, wherein the contextual information comprises one or more polygon context objects that identify one or more of buildings, waterways, and land use.

10. The method of claim 1, wherein the contextual information comprises one or more polyline context objects that identify one or more of roadway features and railway features.

11. The method of claim 1, wherein the contextual information comprises one or more point context objects that identify one or more of points and places.

12. The method of claim 1, wherein the contextual information comprises a plurality of polygon context objects, each polygon context object including geographical reference information that identifies a location of the each polygon context object with respect to the earth; and wherein generating the mask based on the contextual information comprises:

projecting the each polygon context object of the plurality of polygon context objects onto the image to form the mask.

13. The method of claim 1, wherein the contextual information comprises a plurality of polygon context objects, each polygon context object including geographical reference information that identifies a location of the each polygon context object with respect to the earth;
determining that one polygon context object of the plurality of polygon context objects represents a structure having a height that exceeds a threshold height;
removing the one polygon context object from the plurality of polygon context objects to form a subset of polygon context objects; and
wherein generating the mask based on the contextual information comprises:
projecting each polygon context object in the subset of polygon context objects onto the image to form the mask.

14. The method of claim 1, further comprising:
determining a target window size based on a size of a target with respect to the image;
determining a maximum number of targets based on the size of the at least one portion of interest and the target window size.

15. The method of claim 14, further comprising:
identifying the target at a location in the image;
suppressing a location area at the location in the image based on the target window size and a context orientation associated with the location.

16. The method of claim 15, wherein the target window size comprises an oblong rectangle having a long axis and a short axis, and wherein the location area is suppressed based on an orientation of the target window size that is based on the context orientation associated with the location.

17. The method of claim 1, wherein processing the at least one portion of interest to detect the target depicted in the at least one image portion of interest comprises processing, by a moving target indicator detector, the at least one image portion of interest to detect the target depicted in the at least one image portion of interest.

18. A system, comprising:
an image sensor configured to capture an image of earth; and
a processor coupled to the image sensor and configured to:
access contextual information that identifies features in an area of the earth;
generate a mask based on the contextual information, the mask spatially corresponding to the image and identifying at least one image portion of interest in the image and at least one image portion of non-interest in the image, wherein generating the mask based on the contextual information comprises:
identifying at least one polyline context object in the contextual information;
generating, based on the at least one polyline context object and a resolution of the image sensor from which the image is generated, a binary non-masked section that is scaled and geo-registered to the image; and
generating the mask based on the binary non-masked section, the mask comprising a non-masked portion defined by the binary non-masked section and a masked portion defined by a binary masked section; and process the at least one image portion of interest to detect a target depicted in the at least one portion of interest.

19. A computer program product stored on a non-transitory computer-readable storage medium and including instructions configured to cause a processor to carry out steps of:
   accessing contextual information that identifies features in an area of earth;
   accessing an image of the area of the earth;
   generating a mask based on the contextual information, the mask spatially corresponding to the image and identifying at least one image portion of interest in the image and at least one image portion of non-interest in the image, wherein generating the mask based on the contextual information comprises:
      identifying at least one polyline context object in the contextual information;
      generating, based on the at least one polyline context object and a resolution of an image sensor from which the image is generated, a binary non-masked section that is scaled and geo-registered to the image; and
      generating the mask based on the binary non-masked section, the mask comprising a non-masked portion defined by the binary non-masked section and a masked portion defined by a binary masked section; and
   processing the at least one portion of interest to detect a target depicted in the at least one portion of interest.

20. A method comprising:
   accessing, by a processor device, contextual information that identifies features in an area of earth;
   accessing, by the processor device, an image of the area of the earth;
   generating, by the processor device, a mask based on the contextual information, the mask spatially corresponding to the image and identifying at least one image portion of interest in the image and at least one image portion of non-interest in the image;
   subdividing, by the processor device, the image into a plurality of chips;
   determining, by the processor device, a first set of chips of the plurality of chips that includes the at least one image portion of interest;
   processing, by the processor device, the first set of chips to generate a corresponding second set of response surface chips, wherein at least some response surface chips of the second set of response surface chips contain imagery that includes some of the at least one image portion of interest and some of the at least one image portion of non-interest;
   processing, by the processor device, the at least some of the response surface chips based on the mask to eliminate the at least one image portion of non-interest from the at least some of the response surface chips; and
   after processing the at least some of the response surface chips based on the mask, processing, by the processor device, the second set of response surface chips to detect a target depicted in the at least one image portion of interest.

21. A method comprising:
   accessing, by a processor device, contextual information that identifies features in an area of earth, wherein the contextual information comprises a plurality of polygon context objects, each polygon context object including geographical reference information that identifies a location of the each polygon context object with respect to the earth;
   accessing, by the processor device, an image of the area of the earth;
   determining, by the processor device, that one polygon context object of the plurality of polygon context objects represents a structure having a height that exceeds a threshold height;
   removing the one polygon context object from the plurality of polygon context objects to form a subset of polygon context objects;
   generating a mask based on the contextual information, the mask spatially corresponding to the image and identifying at least one image portion of interest in the image and at least one image portion of non-interest in the image, wherein generating the mask based on the contextual information comprises projecting each polygon context object in the subset of polygon context objects onto the image to form the mask; and
   processing the at least one image portion of interest to detect a target depicted in the at least one image portion of interest.

* * * * *